US009501584B2

(12) United States Patent
Deshpande (10) Patent No.: US 9,501,584 B2
(45) Date of Patent: Nov. 22, 2016

(54) APPARATUS AND METHOD FOR DISTRIBUTING A SEARCH KEY IN A TERNARY MEMORY ARRAY (71) Applicant: Broadcom Corporation, Irvine, CA (US)

(72) Inventor: Chetan Deshpande, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 202 days.

(21) Appl. No.: 13/758,600

(22) Filed: Feb. 4, 2013

(65) Prior Publication Data

US 2014/0223092 A1 Aug. 7, 2014

(51) Int. Cl.
*G06F 17/30* (2006.01)
(52) U.S. Cl.
CPC ... *G06F 17/30979* (2013.01); *G06F 17/30982* (2013.01); *Y02B 60/188* (2013.01)
(58) Field of Classification Search
CPC .................. G06F 17/30982; G06F 17/30985; G06F 17/30979
See application file for complete search history.

(56) References Cited

U.S. PATENT DOCUMENTS

| 6,324,087 | B1* | 11/2001 | Pereira | G06F 17/30982 365/189.07 |
| 6,658,002 | B1* | 12/2003 | Ross | H04L 45/50 370/392 |
| 6,717,946 | B1* | 4/2004 | Hariguchi et al. | 370/392 |
| 7,739,445 | B1* | 6/2010 | Venkatachary | G11C 15/00 365/49.17 |
| 2002/0191605 | A1* | 12/2002 | Lunteren et al. | 370/389 |
| 2004/0024757 | A1* | 2/2004 | Park | G11C 15/00 |
| 2004/0205292 | A1* | 10/2004 | Lu | 711/108 |
| 2006/0155915 | A1* | 7/2006 | Pereira | 711/100 |
| 2010/0080224 | A1* | 4/2010 | Panwar | H04L 45/745 370/392 |

OTHER PUBLICATIONS

M. Akhbarizadeh, M. Nourani, R. Panigrahy, and S. Sharma, "A TCAM-based parallel architecture for high-speed packet forwarding," IEEE Trans. Comput., vol. 56, No. 1, pp. 58-2007, Jan. 2007.*

(Continued)

*Primary Examiner* — David X Yi
*Assistant Examiner* — Francisco Grullon
(74) *Attorney, Agent, or Firm* — Sterne, Kessler, Goldstein & Fox PLLC (57) ABSTRACT Separate key processing units generate different search keys based off of a single master key received at a ternary memory array chip. A reference search key and selection logic are provided to reduce power dissipation in a global search key bus across the chip. The reference search key is the output of one of the key processing units and its bytes are compared with the output from each of the other key processing units. A select signal from each unit indicates which bytes match. Each matching byte at each key processing unit is blocked from changing corresponding bit line logic values across the chip, reducing the number of voltage switches occurring in the global search key bus. The select signal causes a selection module local to each superblock to select the matching byte(s) from the reference search key and non-matching byte(s) from the global search key bus to reconstitute the entire search key.

20 Claims, 6 Drawing Sheets

(56) References Cited

OTHER PUBLICATIONS

J. van Lunteren and T. Engbersen, "Fast and scalable packet classification," IEEE J. Sel. Areas Commun., vol. 21, No. 4, pp. 560-571, 2003.*

J. van Lunteren and A. P. J. Engbersen. Multi-Field Packet Classification Using Ternary CAM. Electronics Letters, 38(1):21-23, 2002.*

* cited by examiner

APPARATUS AND METHOD FOR DISTRIBUTING A SEARCH KEY IN A TERNARY MEMORY ARRAY

BACKGROUND

Field of Disclosure

The present disclosure relates generally to the transmission of data across buses in a ternary memory, and more particularly to the transmission of multiple search keys that share many bytes in common in a manner to reduce power consumption in the transmission across the ternary memory.

Related Art

Communication devices, such as routers and servers, are commonly used in both corporate and personal settings to handle data and network throughput. These communication devices provide users with cross-communication abilities between devices, as well as the ability to communicate over larger networks like the interne.

In order to properly process incoming data packets, a communication device must accurately identify the actions to be performed on each packet. The actions to be performed are stored as rules associated with an Access Control List (ACL). The communication device selects a rale to be performed on a received packet based on one or more packet characteristics, such as the packet's source port and/or destination port. Each rule may be applicable to several ports and thus require several data entries in a Ternary Content Addressable Memory (TCAM).

In order to select a rule to be performed on a received packet, information from the received packet, such as the destination address of the received packet, is input as a master search key to key processing units (KPU). The KPUs each re-arrange or replace particular bytes of the master search key according to application-specific profiles pre-programmed into an associated buffer. Each KPU outputs a search key that may have one or more bytes changed or replaced according to a particular profile, and all of the search keys are routed across an entire chip, such as a knowledge-based processor, to a TCAM array, typically arranged in superblocks. The particular key to be used at each superblock is selected locally at the superblock.

As new packets are received each cycle, this results in the search key data output from each KPU switching (such as from logic high to logic low, or vice versa) across the bus each cycle. Often, however, many of the bytes in the search keys from each of the KPUs remain the same as the master search key. The resulting switching of the data across the bus is a significant source of power consumption and loss. This power consumption also increases as the frequency of operation increases.

BRIEF DESCRIPTION OF THE DRAWINGS/FIGURES

The present disclosure is described with reference to the accompanying drawings. In the drawings, like reference numbers generally indicate identical, functionally similar, and/or structurally similar elements. Additionally, the left most digit(s) of a reference number identifies the drawing in which an element first appears.

The disclosure will now be described with reference to the accompanying drawings.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" shall be understood to include at least one of software, firmware, and hardware (such as one or more circuits, microchips, or devices, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of packet communication (specifically within a router), those skilled in the relevant art(s) will recognize that this description may also be applicable to other communications that use other communication protocols and/or which are performed within a server or communication end user, such as a cellular telephone, laptop computer, PDA, etc.

Exemplary Wireless Communications Environment

Figure 1:
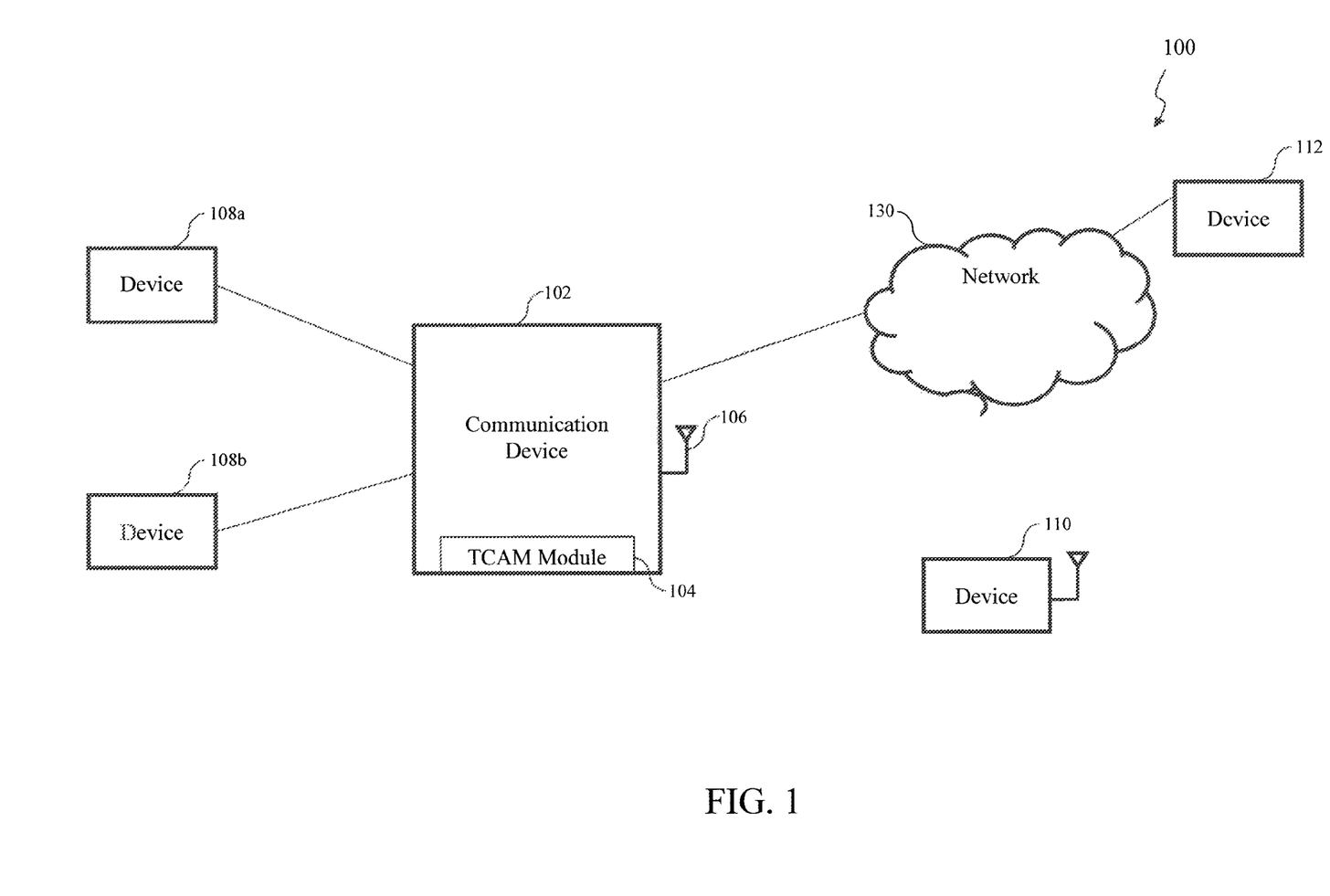
FIG. 1 illustrates a block diagram of an exemplary communication environment.

FIG. 1 illustrates a block diagram of an exemplary communication environment 100. The communication environment 100 provides communication of information, such as one or more commands and/or data, between communication devices. The communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary communication environment 100 includes a communication device 102. The communication device 102 includes a TCAM module 104 according to the present disclosure, and optionally includes a wireless antenna 106 for wireless communication with other wireless communication devices. For purposes of this discussion, the communication device 102 functions as a router that processes and forwards data packets received from one or more communication devices in the communication environment 100 to other communication devices in the communication environment 100.

Such devices may include devices 108a and 108b which are hard-wire connected to the communication device and a wireless communication device 110 that wirelessly communicates with the communication device 102. The communication device 102, the devices 108a and 108b, and the wireless device 110 may all be located within a home network, femtocell or other small local area network. The communication device 102 may also be capable of communicating with out-of-network devices (i.e., device 112) via a larger network 130 (e.g., Internet).

The TCAM module 104 of the communication device 102 stores ACLs and processes received packets from the various devices. The TCAM module routes search keys that are derived from the received packets over bus lines of a global bus, and consumes less power on the bus lines when implemented in accordance with the present disclosure.

Detailed functionality of the communication device, and of the TCAM module 104, is discussed below with respect to the relevant figures.

Exemplary Router

Figure 2:
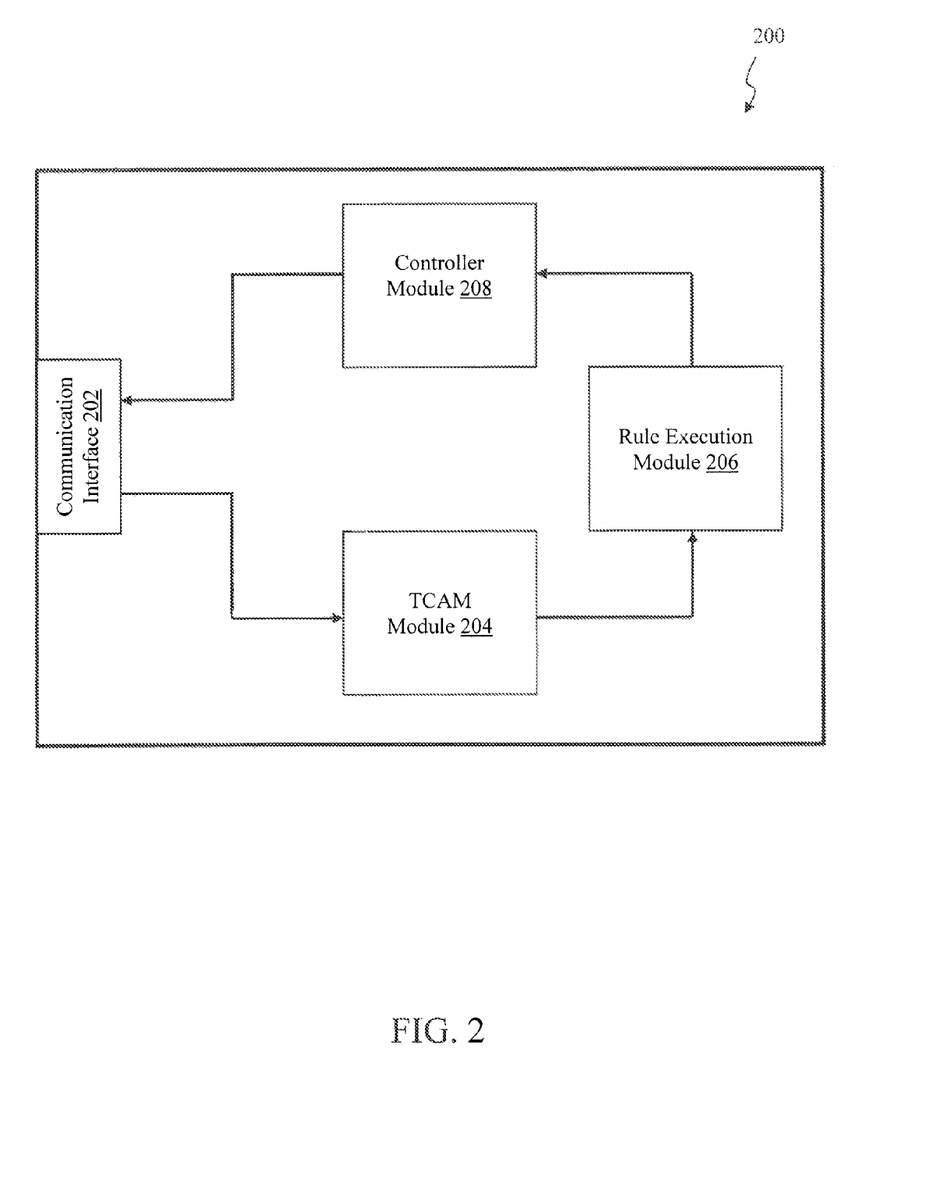
FIG. 2 illustrates a block diagram of an exemplary communication device that may be implemented within the communication environment.

FIG. 2 illustrates a block diagram of an exemplary communication device 200 that may be implemented within the communication environment 100. The communication device 200 includes a TCAM module 204 and a rule execution module 206, and may represent an exemplary embodiment of the communication device 102.

In the communication device 200, the TCAM module 204 stores ACLs. The communication device 200 receives data packets from external devices via its communication interface 202 that may include a plurality of source and/or destination ports. These packets are forwarded to the TCAM module 204 for rule determination.

Each packet received includes source and/or destination port information, which the TCAM module 204 encodes. Based on the encoded port information, the TCAM module 204 identifies applicable rules, and then selects a rule for application based on rale priority information. The TCAM module 204 forwards the data packet to the rule execution module 206 along with the selected rule, which executes the selected rule on the received data packet.

The rule execution module 206 forwards the processed data packet to a controller module 208 for performing any necessary additional processes before being forwarded back to the communication interface 202. The communication interface 202 then transmits a response packet to the originating device and/or forwards data information to another device within the communication environment 100.

It should be noted that FIG. 2, as well as the rest of the figures of the present application, represent block diagrams of various aspects of the present disclosure. Those skilled in the relevant art(s) will recognize that not all interconnections to and from all of the functional modules or devices are shown for sake of simplicity, but will be easily recognizable.

Exemplary Chipset Configuration

Figure 3:
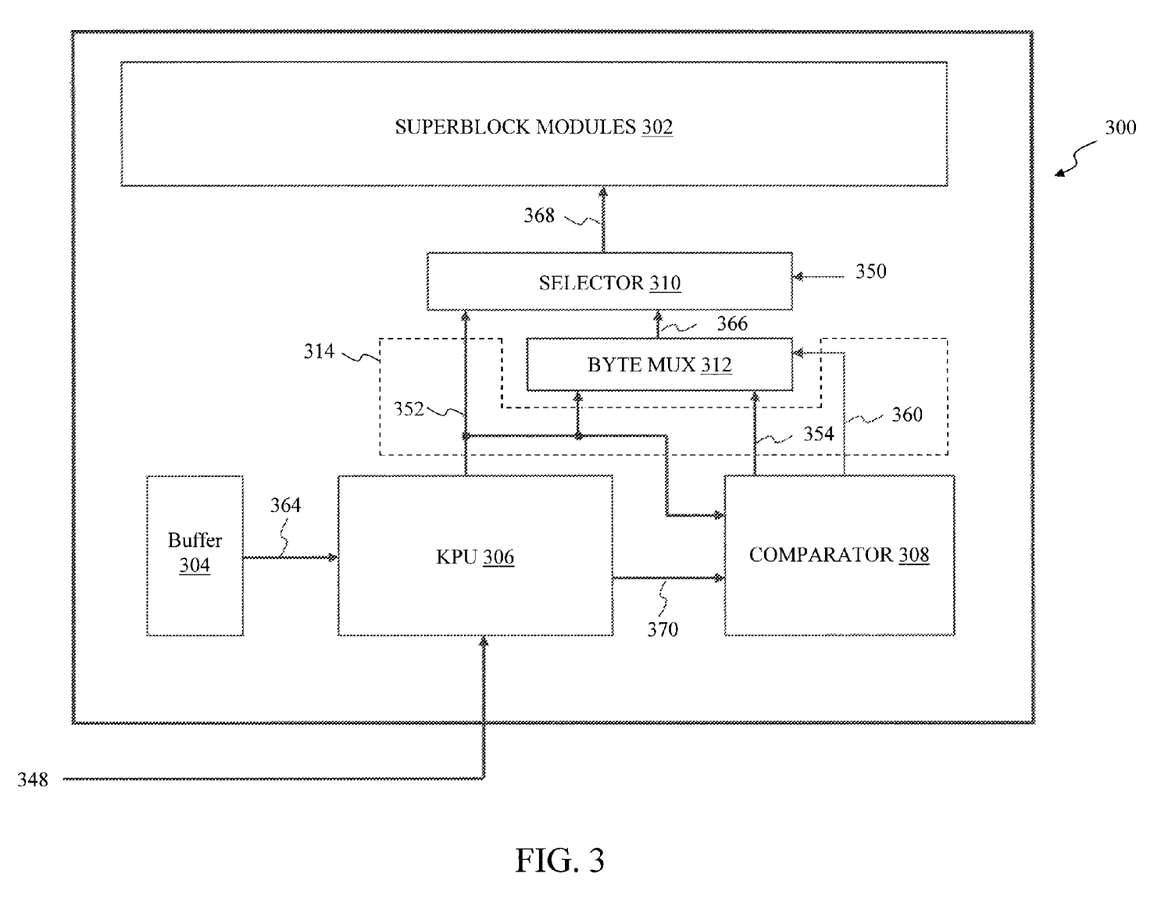
FIG. 3 illustrates a block diagram of an exemplary device according to an embodiment of the present disclosure.

FIG. 3 illustrates a high level block diagram of an exemplary device 300 according to an embodiment of the present disclosure. Device 300 may represent an exemplary embodiment of the TCAM module 204. Device 300 may additionally or alternatively be, among other things, a knowledge-based processor or other type of circuit capable of storing data that is used for comparison to determine matches, such as circuits that include TCAM arrays. The overall functionality of device 300 will be discussed with respect to FIG. 3, and a detailed discussion will follow with respect to FIG. 4.

Device 300 receives a master search key 348 from the communication interface 202. The master search key 348 may be the destination address of a received packet, such as one received at the communication device 200. The master search key 348 could also be any other kind of data that is to be compared against data stored in a TCAM array. In one exemplary embodiment, the master search key 348 may be 320 bits wide; alternatively, the width of the master search key 348 may be greater or smaller than 320 bits. In another exemplary embodiment, the master search key may be 640 bits wide, or wider depending on the needs and limitations of the particular application. The following discussion will be described in terms of a 320-bit wide search key, though other widths are envisioned.

The master search key 348 is input into the KPU module 306. The KPU module 306 may be designed to generate one or multiple search keys based on the master search key 348. In embodiments where the KPU module 306 generates multiple search keys, each search key is generated based on the same master search key 348. Buffer 304 outputs a select signal 364 to the KPU module 306. Buffer 304 may additionally or alternatively he a first-in, first-out (FIFO) memory or a ROM. The buffer 304 is pre-programmed with different profiles. When new data arrives, such as a new incoming packet, the packet contains information that the buffer uses to determine which profile should he applied to the KPU module 306. These profiles detail which, if any, bytes in the master search key 348 should be replaced with data from the respective profile in the buffer 304 or swapped around within the master search key 348 by the KPU module 306 for each search key, Once the KPU module 306 has completed processing on the master search key 348, it outputs a modified search key 370 of the same bit width as the master search key. The KPU module 306 also outputs a reference search key 352. The reference search key 352 may also he the same width as the master search key 348. The modified search key 370 output from the KPU module is input into comparator module 308, and represents the one or multiple modified search keys generated by the KPU module 306.

Comparator module 308 receives the modified search key 370 as well as the reference search key 352 from the KPU 306. The comparator module 308 compares the bytes of the modified search key 370 from the KPU module 306 with the bytes of the reference search key 352. The comparison may be a byte-by-byte comparison of the modified search key 370, e.g. each of 40 bytes based on a 320-bit master search key 348. in alternative embodiments, the comparison may have different levels of granularity, such as every two bytes, every ten, or any other number of bytes together as will be recognized by persons skilled in the relevant art(s). The selection of the level of granularity may be pre-programmed in the device 300, or alternatively may be dynamically changed during operation of the device 300. Where the KPU module 306 generates multiple modified search keys 370, the comparator module 308 is designed to receive each modified search key 370 and perform the comparison of each against the reference search key 352.

The comparator module 308 outputs the results of the comparison as the select signal 360, as well as a reduced search key 354, which is a modified form of the modified search key 370. The select signal 360 indicates which bytes match between the reference search key 352 and the modified search key 370 output from the KPU module 306, depending on the level of granularity of the comparison.

The comparator module 308 only changes (from clock cycle to the next) the logic level of those bits in the reduced search key 354 that correspond to non-matching bytes found in the comparison between the modified search key 370 and the reference search key 352. A global bus distributes the reduced search key 354 to various superblock(s) across the TCAM device. Therefore, power consumption is reduced for key transfer over the global bus because the matching byte(s) in the reduced search key 354 do not change logic state from one clock cycle the next, eliminating the charging and discharging of the various capacitors and transistors that make up the global bus.

Where the KPU module 306 generates multiple modified search keys 370, the comparator module 308 outputs a corresponding number of reduced search keys 354, each with only those bits changed that correspond to non-matching bytes found in the comparison between the corresponding modified search keys 370 and the reference search key 352. Although the reduced search key 354 is described as being "reduced," it is still the same bit width as the master search key 348 to enable it to reflect any differences in any bytes between the corresponding modified search key 370 and the reference search key 352. The search key 354 is "reduced" in the sense that only the logic levels of those bits in the reduced search key 354 are changed that correspond to non-matching bytes found in the comparison between modified search key 370 and reference search key 352.

The reduced search key 354 is routed across device 300 via, for example, a global bus line (such as shown by element 314 in FIG. 3), to a byte multiplexer module 312, which may be one or more byte multiplexers. The global bus line may include, for example, the reference search key 352, the reduced search key 354, and the select signal 360. The byte multiplexer module 312 may receive the reference search key 352 and the reduced search key 354 in situations where the KPU module 306 is designed to generate only one modified search key 370. Where the KPU module 306 is designed to generate multiple modified search keys 370, the byte multiplexer module 312 is designed to receive the reference search key 352 and multiple reduced search keys 354 that correspond in number and content to each of the modified search keys 370. In either embodiment, the byte multiplexer module 312 also receives the select signal 360. The byte multiplexer module 312 outputs combined search key 366. The byte multiplexer module 312 creates the combined search key 366 based on the select signal 360 by selecting those bytes from the reference search key 352 that were found to match bytes from the modified search key 370 output from the KPU module 306, and selecting those bytes from the reduced search key 354 that were found to not match any bytes in the reference search key 352.

The combined search key 366, which may represent a bus of combined search keys 366 corresponding in number to as many modified search keys 370 as were output by the KPU module 306, is input into selector module 310, which may be, for example, another multiplexer with inputs corresponding to the number of modified search keys 370 generated in the KPU module 306 in addition to the reference search key 352. Based on a local select signal 350, the selector module 310 selects which search key, from among the combined search key(s) 366 and the reference search key 352, will enter the TCAM superblock module 302 as the search key 368. The TCAM superblock module 302 may represent one or more TCAM arrays.

In the above manner, the data that remains the same between bytes of the various modified search keys does not have to be switched between logic high and logic low, because typically only the reference search key 352 will have to reflect any byte changes common to the modified search key 370 (or all of them, where there are multiple modified search keys 370). Significant power savings are achieved because fewer data lines are switched between logic low and logic high on the global bus line 314 (or vice versa).

Figure 4:
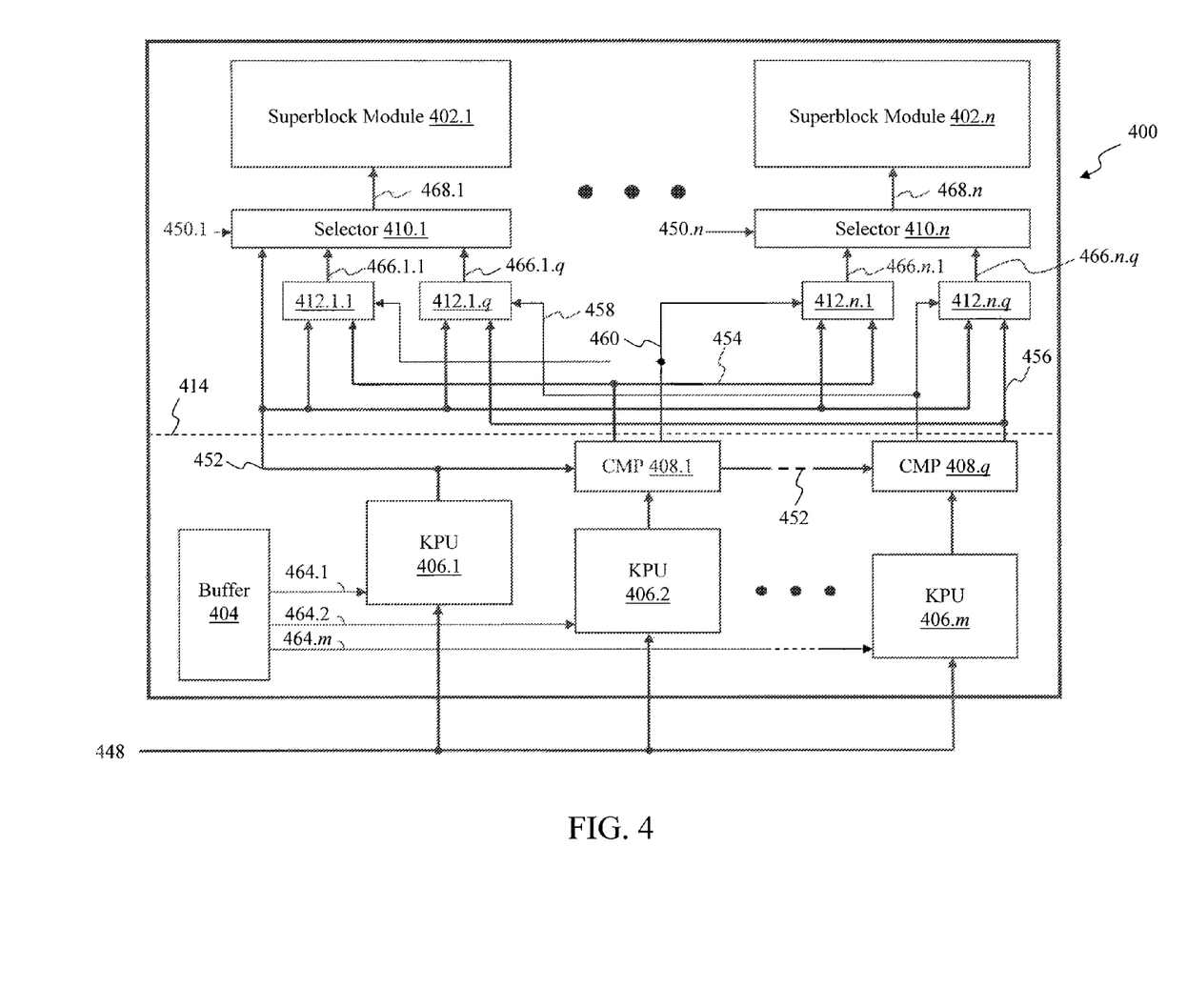
FIG. 4 illustrates a block diagram of an exemplary device according to an embodiment of the present disclosure.

FIG. 4 illustrates a more detailed block diagram of an exemplary device 400 according to an embodiment of the present disclosure. The device 400 includes TCAM superblock modules 402.1 through 402.n, corresponding selectors 410.1 through 410.n, key selectors 412.1.1 through 412.n.q, comparators 408.1 through 408.q, KPUs 406.1 through 406.m, and buffer 404. Device 400 may represent an exemplary or alternative embodiment of the device 300 of FIG. 3.

Device 400 receives a master search key 448 from the communication interface 202 substantially similar as master search key 348 discussed above. The master search key 448 is input into each KPU 406.1, 406.2 through 406.m. In one embodiment, there may be four KPUs in a given application, or fewer or more depending on the particular device. Each KPU 406.1 through 406.m receives the same master search key 448. FIG. 4 illustrates the KPUs 406.1 through 406.m as individual modules. Buffer 404 outputs different select signals 464.1 through 464.m to each KPU 406.1 through 406.m. Buffer 404 may additionally or alternatively be a first-in, first-out (FIFO) memory or a ROM. The buffer 404 is pre-programmed with different profiles. When new data arrives, such as a new incoming packet, it contains information that the buffer uses to determine which profile should be applied to each KPU 406.1 through 406.m. These profiles detail which, if any, bytes in the master search key 448 should be replaced with data from the respective profile or swapped around within the search key within the given KPU.

Once each KPU 406.1 through 406.m has completed processing on the master search key 448, it outputs a modified search key of the same width as the master search key. One of the KPUs 406.1 through 406.m outputs a reference search key 452. FIG. 4 illustrates the first KPU 406.1 as outputting the reference search key 452. However, the present disclosure contemplates that the modified search key output from any of the KPUs 406.1 through 406.m may be used as the reference search key 452. The modified search key output from the remaining KPUs 406.2 through 406.m are input into corresponding comparators 408.1 through 408.q, where q represents m−1 comparators, or one comparator less than the number of KPUs in any device 400 in accordance with the present disclosure.

Comparator 408.1 receives the modified search key from KPU 406.2 as well as the reference search key 452 that is output from KPU 406.1. The comparator 408.1 compares the bytes of the modified search key from KPU 406.2 with the bytes of the reference search key 452. The comparison may be between every single byte of each search key, e.g. each of 40 bytes based on a 320-bit master search key 448. In alternative embodiments, the comparison may be between different levels of granularity, such as every two bytes, every ten, or any other number of bytes together as will be recognized by persons skilled in the relevant art(s). The selection of the level of granularity may be pre-programmed in the device 400, or alternatively may be dynamically changed during operation of the device 400. Herein, the term "modified search key" may be referred to simply as "search key", for short notation to distinguish from the reference search key, The results of the comparison are output by the comparator 408.1 as the select signal 460, as well as a reduced search key 454. The select signal 460 identifies those bytes that are the same between the reference search key 452 and the modified search key output from the KPU 406.2. A byte in the modified search key from KPU 406.2 that is found to match a byte in the reference search key 452 indicates either that those particular bytes were changed the same way based on profiles received from the buffer 404, or that those particular bytes were not changed from their prior content of the corresponding byte in the master search key 448, wherein the prior content refers to the previous state of corresponding bits during the prior clock cycle. The bytes in each modified search key may be arranged in either the same order or a different order than the corresponding bytes in the master search key 448.

The comparator 408.1 only changes those bits in the reduced search key 454 that correspond to non-matching bytes found from the comparison between the modified search key from the KPU 406.2 and the reference search key 452, such as from logic high to logic low or vice-versa depending on the previous state of the given bits. By way of example, in a situation where all of the bytes match between the modified search key and the reference search key 452, none of the bits would change in the reduced search key 454, even where the modified search key from the KPU 406.2 in the current clock cycle is different than what was output as the reduced search key 454 from the comparator 408.1 in the prior clock cycle. Matching bytes are basically treated as "don't care" values in the reduced search key 454 for the purposes of the selector circuits, as discussed in detail below.

The other comparators 408.2 (not shown) through 408.q also receive the reference search key 452 and perform the same type of operations using their respective modified search key received from their corresponding KPU 406.3 (not shown) through 406.m, outputting corresponding select signals and reduced search keys (such as exemplary select signal 458 and reduced search key 456 corresponding to comparator 408.q).

The reduced search key 454 is routed across device 400 via, for example, a global bus line, to one or more selector circuits, such as byte multiplexers 412.1.1 through 412.n.q. The global bus line may include, for example, the reference search key 452, the reduced search keys 454 and 456, the other reduced search keys as output from each comparator not expressly shown in FIG. 4, and the corresponding select signals 458 and 460. In an example, byte multiplexer 412.1.1 receives as input the reference search key 452, the reduced search key 454, and the select signal 460. The byte multiplexer 412.1.1 outputs combined search key 466.1.1. The byte multiplexer 412.1.1 creates the combined search key 466.1.1 based on the select signal 460 by selecting those bytes from the reference search key 452 that were found to match bytes from the modified search key output from the KPU 406.2, and selecting those bytes from the modified search key 454 that were found to not match any bytes in the reference search key 452.

The other byte multiplexers 412.1.2 through 412.n.q operate in the same manner as the byte multiplexer 412.1.1 with their respective signals. For example, byte multiplexer 412.1.q receives as its input the reference search key 452, reduced search key 456, and the select signal 458, corresponding to the output from the qth comparator 408.q. In general, there are q byte multiplexers 412.1.q, corresponding to the q comparators, assigned to each superblock module 402.1 through 402.n, each of which is configured to perform the same type of operation as discussed above with respect to the byte multiplexer 412.1.1 with corresponding reduced search keys and the reference search key 452.

Focusing again on the byte multiplexer 412.1.1 for the sake of discussion, the combined search key 466.1.1 is input into selector 410.1, which may be, for example, another multiplexer with m inputs corresponding to the number of KPUs in the device 400, here KPUs 406.1 through 406.m. The selector 410.1 also receives combined search key 466.1.q and the reference search key 452. Based on a local select signal 450.1, the selector 410.1 selects which search key will enter the superblock module 402.1 as the search key 468.1. There are n selectors corresponding to the n superblock modules of device 400, each operating in the same manner as discussed above with their respective signals.

In FIG. 4, dashed line boundary 414 represents a register transfer layer (RTL) boundary. For example, above the boundary 414, such as the superblock modules 402.1 through 402.*n* and the different selectors, the circuitry is typically all custom-designed logic that is highly tailored to each particular chipset or application. Below the boundary 414, the components are typically components that find application in a plurality of other settings, such as the KPUs 406.1 through 406.*m*, the comparators 408.1 through 408.*q*, and the buffer 404. However, in alternative embodiments the components both above and below the RTL boundary 414 may be customized to a particular application.

FIG. 4 illustrates the KPUs 406.1 through 406.*m*, comparators 408.1 through 408.*q*, byte multiplexers 412.1.1 through 412.1.*q*, and byte multiplexers 412.*n*.1 through 412.*n*.*q* as individual modules. These different modules may be integrated together into master KPU, comparator, and byte multiplexer modules as generally shown in FIG. 3. These master KPU, comparator, and byte multiplexer modules may be capable of receiving the same inputs and outputting the same plurality of signals corresponding to search keys, modified search keys, combined search keys, and select signals, but designed and integrated into single integrated circuits or areas on a die. Additionally or alternatively, the master KPU and comparator modules may further be designed as a single integrated circuit or area on a die.

Exemplary Method

Figure 5:
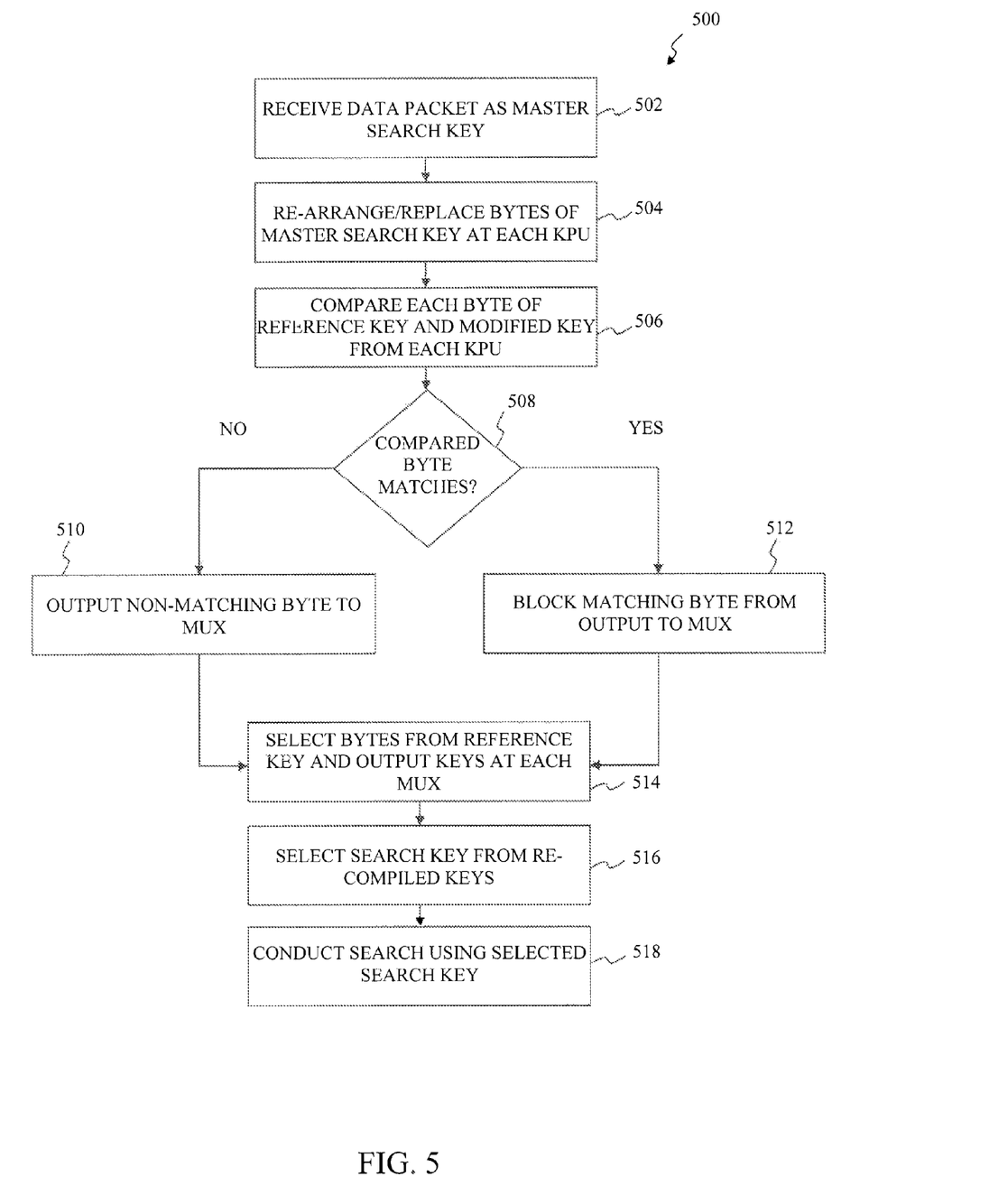
FIG. 5 illustrates a flow chart of exemplary operational steps for utilizing a reference search key, according to an exemplary embodiment of the present disclosure.

FIG. 5 illustrates a flow chart of exemplary operational steps for utilizing a reference search key, according to an exemplary embodiment of the present disclosure. The following steps will be discussed, as an example, with respect to device 400.

Method 500 begins with step 502. At step 502, data is received at device 400, such as an incoming data packet if device 400 is part of a router, as discussed above with respect to FIG. 2. The received data packet functions as a master search key. The master search key is then input into KPUs 406.1 through 406.*m* for further processing.

At step 504, each KPU 406.1 through 406.*m* may re-arrange or replace one or more bytes of the master search key. This is based on a corresponding select signal from a buffer, such as buffer 404, which stores pre-programmed profiles. When the data packet is received at the device 400, the buffer 404 determines which profiles will be sent via select signals 464.1 through 464.*m* to each of KPUs 406.1 through 406.*m* based on the information contained within the data packet.

At step 506, a comparator corresponding to m−1 KPUs 406.1 through 406.*m* receives the modified search key and compares the modified search key from the respective KPU with a reference search key from one of the KPUs that has no corresponding comparator. The comparison is between, for example, each byte of each of the modified search key and the reference search key. The comparison could alternatively be between every two bytes, every ten, or other number of bytes in combination. This comparison is performed in each corresponding comparator between a corresponding modified search key and the reference search key.

At step 508, if the comparison of a given byte of the modified search key indicates that there is not a match to any byte of the reference search key, the non-matching byte (or block of bytes, depending on the granularity of the comparison) is output at step 510 as the reduced search key 454 (or 456) on a global bus line that is routed to the multiplexers local to each superblock module.

If the comparison of a given byte of the modified search key indicates that there is a match to any byte of the reference search key, the comparator blocks the matching byte of the modified search key at step 512, such that the data in the matching byte are not placed on the bus. In this way, the bit lines of the bus corresponding to the matching byte(s) are not switched from logic low to high (or logic high to low), thus decreasing power consumption. Stated another way, only non-matching byte(s) between the reference and modified search keys cause a logic change on the global bus from one clock cycle to the next.

For each of steps 510 and 512 above, the comparator also outputs a select signal that indicates which bytes of the modified search key on the bus should be compiled at a multiplexer from the reference search key and which should be compiled from the modified search key on the bus. In other words, the select signal identifies the matching bytes that can be used to reconstruct the combined search key at the superblock module.

At step 514, selectors, such as byte multiplexers 412.1.1 through 412.*n*.*q* (the number of byte multiplexers corresponding to the number of comparators and duplicated for each superblock module), create a combined search key based on the inputs from the reference search key and the modified search key on the bus. The combination is determined based on the select signal from each comparator. For each byte that the select signal indicates there was no match, the byte multiplexer takes the byte from the modified search key from the bus. For each byte that the select signal indicates there was a match, the byte multiplexer takes the matching byte from the reference search key.

At step 516, now that a combined search key has been re-compiled corresponding to each comparator, another selector receives as many combined search keys as there are KPUs in the device 400, including reference search key 452, and selects which search key will be input into the corresponding superblock module based on a local select signal. This occurs at a selector located with each superblock module of the device 400.

At step 518, each superblock module performs a search using the corresponding selected search key from step 516. The search is performed in order to find any matches within the TCAM array, which in one example is used to determine at which output ports the received data packet should be placed.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
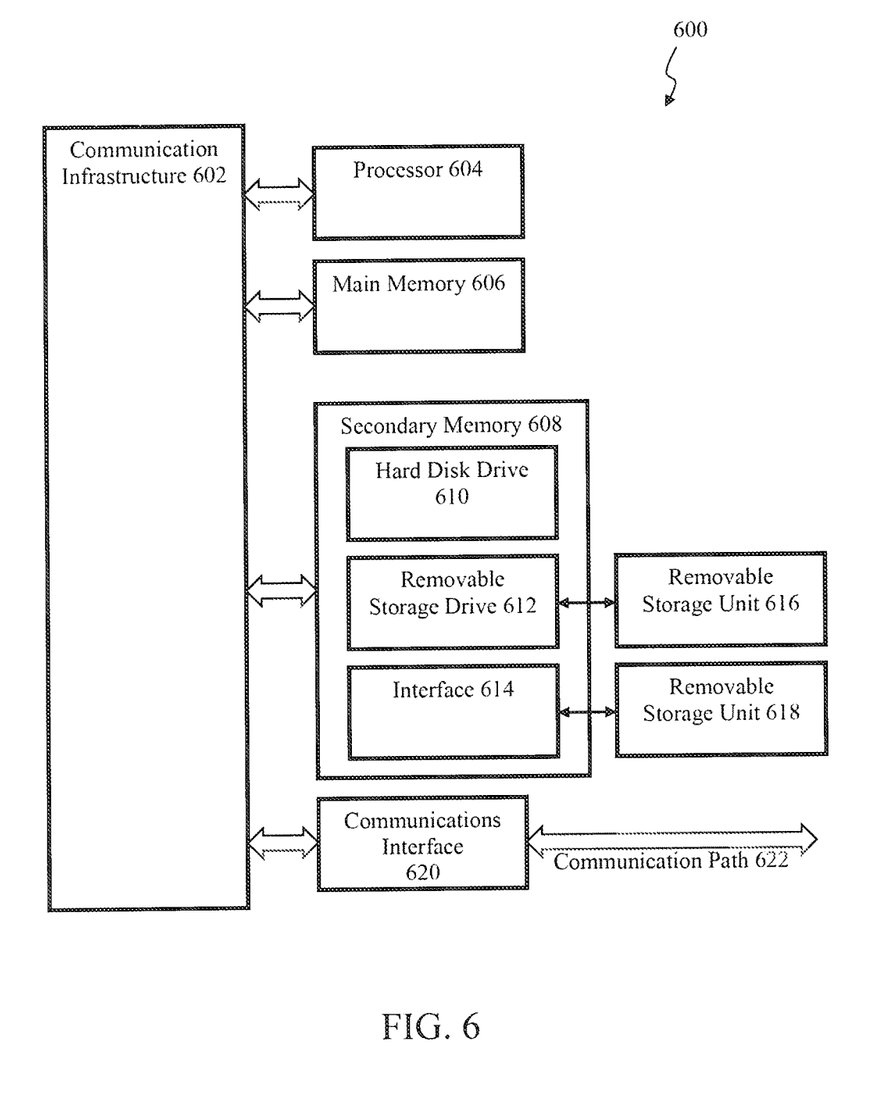
FIG. 6 illustrates a block diagram of an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system, An example of such a computer system 600 is shown in FIG. 6. One or more of the modules depicted in the previous figures can be implemented by one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably RAM, and may also include a secondary memory 608. Secondary memory 608 may include, for example, a hard disk drive 610 and/or a removable storage drive 612, representing a floppy disk drive, a magnetic tape drive, an optical disk drive, a flash memory drive, or the like. Removable storage drive 612 reads from and/or writes to a removable storage unit 616 in a well-known manner. Removable storage unit 616 represents a floppy disk, magnetic tape, optical disk, flash memory, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a flash memory drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the present disclosure should not be limited by any of the above-described exemplary embodiments, but should be defined only in accordance with the following claims and their equivalents.

What is claimed is:

1. A device, comprising:
   a global bus; and
   one or more processors and/or circuits configured with:
   a key processing module configured to receive a data packet and to output a reference search key and a search key based on the data packet;
   a comparator module configured to:
   compare bytes of the search key against bytes of the reference search key to determine matching bytes and non-matching bytes of the search key,
   generate a reduced search key based on the results of the comparison, the reduced search key including only the non-matching bytes of the search key, and excluding the matching bytes of the search key;
   output the reduced search key onto the global bus by blocking the matching bytes from being placed onto the global bus;
   generate a byte select signal that indicates which bytes of the search key are the matching bytes and which bytes of the search key are the non-matching bytes; and
   output the byte select signal onto the global bus; and
   a selector module corresponding to the comparator module, the selector module configured to receive the reference search key, the reduced search key, and the byte select signal, and further configured to select, based on the byte select signal, the non-matching bytes from the reduced search key and the matching bytes from the reference search key to create a combined search key.

2. The device of claim 1, further comprising:
   an array of ternary content-addressable memory (TCAM) modules;
   a buffer configured to store a plurality of profiles, the buffer selecting separate profiles indicating which bytes of the data packet to modify to create the reference search key and the search key; and a TCAM key selector module corresponding to a TCAM module from the array of TCAM modules, the TCAM key selector module being configured to select one of the reference search key and the combined search key for input into the TCAM module.

3. The device of claim 1, further comprising:
an array of ternary content-addressable memory (TCAM) modules, wherein:
the key processing module is one of a plurality of key processing modules, each key processing module configured to receive the data packet and output a corresponding search key based on the data packet;
the comparator module is one of a plurality of comparator modules corresponding to the plurality of key processing modules;
the selector module is one of a plurality of selector modules corresponding to the plurality of comparator modules; and
the global bus has a bit width equaling a combined bit width of the reference search key and the corresponding search key from each key processing module from the plurality of key processing modules.

4. The device of claim 1, further comprising a knowledge-based processor.

5. The device of claim 4, wherein the knowledge-based processor comprises a component of a router.

6. The device of claim 1, wherein the comparator module is further configured to compare each byte of the search key against each byte of the reference search key.

7. The device of claim 1, wherein the comparator module is further configured to compare every two bytes of the search key against every two bytes of the reference search key.

8. A method, comprising:
modifying individual bytes of a data packet in first and second key processing modules based on profile data;
comparing a reference search key from the first key processing module with a search key from the second key processing module at a comparator module to determine matching bytes and non-matching bytes of the search key;
generating a reduced search key based on the results of the comparison, the reduced search key including only the non-matching bytes of the search key, and excluding matching bytes of the search key;
outputting the reduced search key onto a global bus, the outputting including blocking the matching bytes from being placed onto the global bus;
generating a select signal based on the comparison; and
generating a combined search key at a selector module by combining the non-matching bytes from the reduced search key and the matching bytes from the reference search key based on the select signal.

9. The method of claim 8, further comprising:
receiving the data packet at the first and second key processing modules; and
generating the select signal in the comparator module, the select signal designating the matching bytes and the non-matching bytes of the search key.

10. The method of claim 8, wherein the modifying further comprises:
replacing the individual bytes with bytes designated in the profile data, the profile data being a pre-programmed profile stored in a buffer.

11. The method of claim 8, further comprising:
selecting between the combined search key and the reference search key for input into a ternary content-addressable memory (TCAM) module.

12. The method of claim 8, wherein:
the modifying further comprises modifying individual bytes of the data packet in a plurality of key processing modules to generate a plurality of search keys, each search key corresponding to a different key processing module from the plurality of key processing modules;
the comparing further comprises comparing the reference search key from the first key processing module with each search key in a plurality of comparator modules, the plurality of comparator modules corresponding to the plurality of key processing modules;
the generating the reduced search key further comprises generating a corresponding reduced search key for each search key at each comparator module;
the outputting further comprises outputting the corresponding reduced search key of each search key at each comparator module; and
the generating the combined search key further comprises generating a corresponding combined search key for each search key at a plurality of selector modules, the plurality of selector modules corresponding to the plurality of comparator modules.

13. The method of claim 8, wherein the comparing further comprises comparing each byte of the search key against each byte of the reference search key.

14. The method of claim 8, wherein the comparing further comprises comparing every two bytes of the search key against every two bytes of the reference search key.

15. A device, comprising;
one or more processors and/or circuits configured with:
a plurality of key processing modules, each configured to receive a master search key derived from a received data packet and to modify one or more bytes of the master search key, wherein a first key processing module from the plurality of key processing modules is configured to output a reference search key and a remainder of the key processing modules are each configured to output a respective search key;
a plurality of comparator modules corresponding to the remainder of the key processing modules, the plurality of comparator modules each having a plurality of output lines and configured to:
compare the respective search key with the reference search key to determine matching bytes and non-matching bytes of the respective search key:
generate a respective reduced search key based on the results of the comparison, the respective reduced search key including only the non-matching bytes of the respective search key, and excluding the matching bytes of the respective search key, such that the matching bytes of the respective search key do not change corresponding bit logic levels on First corresponding output lines of the plurality of output lines;
output the respective reduced search key on second corresponding output lines of the plurality of output lines, the outputting including blocking the matching bytes from being placed onto the plurality of output lines; and
a plurality of selector modules corresponding to the plurality of comparator modules configured to generate a plurality of composite search keys, each selector module being configured to select the non-matching bytes of the respective reduced search key and the matching bytes from the reference search key to generate a respective composite search key.

16. The device of claim 15, further comprising:
a plurality of ternary content-addressable memory (TCAM) superblocks;
a plurality of key selector modules corresponding to the plurality of TCAM superblocks, each key selector module configured to select one from among the reference search key and the plurality of composite search keys for input into a corresponding TCAM superblock.

17. The device of claim 15, wherein:
the output lines of each comparator module are combined into a global bus, the global bus comprising a bit width equaling a combined bit width of the reference search key and each search key from the plurality of key processing modules.

18. The device of claim 15, wherein a bit width of each composite search key from the plurality of selector modules equals a bit width of the master search key.

19. The device of claim 15, wherein the plurality of selector modules are configured to select based on select signals generated from the corresponding plurality of comparator modules, each select signal being encoded with data representing the matching bytes and the non-matching bytes of the respective search key.

20. The device of claim 15, wherein each comparator module is configured to compare bytes of the respective search key with the reference search key, the number of bytes being compared per comparison being dynamically changeable.

* * * * *

UNITED STATES PATENT AND TRADEMARK OFFICE
CERTIFICATE OF CORRECTION

PATENT NO. : 9,501,584 B2
APPLICATION NO. : 13/758600
DATED : November 22, 2016
INVENTOR(S) : Chetan Deshpande It is certified that error appears in the above-identified patent and that said Letters Patent is hereby corrected as shown below:

In the Claims

In Column 14, Line 33, replace "A device, comprising;" with --A device, comprising:--.

In Column 14, Line 50, replace "respective search key:" with --respective search key;--.

In Column 14, Line 58, replace "First corresponding output" with --first corresponding output--.

Signed and Sealed this
Eighth Day of May, 2018

Andrei Iancu
*Director of the United States Patent and Trademark Office*